(12) United States Patent
Nicholson et al.

(10) Patent No.: US 6,563,425 B2
(45) Date of Patent: May 13, 2003

(54) RFID PASSIVE REPEATER SYSTEM AND APPARATUS

(75) Inventors: Mark R Nicholson, Scotts Valley, CA (US); Norman E. Jones, Boulder Creek, CA (US); Edward A. Jesser, Los Gatos, CA (US)

(73) Assignee: Escort Memory Systems, Scotts Valley, CA (US)

( * ) Notice: Subject to any disclaimer, the term of this patent is extended or adjusted under 35 U.S.C. 154(b) by 0 days.

(21) Appl. No.: 09/925,229

(22) Filed: Aug. 8, 2001

(65) Prior Publication Data

US 2002/0021208 A1 Feb. 21, 2002

(Under 37 CFR 1.47)

Related U.S. Application Data

(60) Provisional application No. 60/224,855, filed on Aug. 11, 2000.

(51) Int. Cl.$^7$ ................................................. G08B 13/14
(52) U.S. Cl. ................................... 340/572.7; 340/572.8
(58) Field of Search ............................... 340/10.1, 10.3, 340/10.4, 545.2, 572.1, 572.7, 572.8; 343/818, 833, 834

(56) References Cited

U.S. PATENT DOCUMENTS

| 5,379,455 | A | | 1/1995 | Koschek |
| 5,600,333 | A | | 2/1997 | Justice et al. |
| 6,107,910 | A | * | 8/2000 | Nysen ........................ 340/10.1 |
| 6,137,403 | A | * | 10/2000 | Desrochers et al. ...... 340/545.2 |
| 6,223,990 | B1 | * | 5/2001 | Kamei ......................... 235/492 |
| 6,278,413 | B1 | * | 8/2001 | Hugh et al. ............... 340/572.8 |
| 6,359,444 | B1 | * | 3/2002 | Grimes ........................ 324/633 |

* cited by examiner

Primary Examiner—Van Trieu
(74) Attorney, Agent, or Firm—Francis Law Group

(57) ABSTRACT

A RFID passive repeater system and apparatus comprising a RFID reader having a magnetic flux field, at least one RFID tag and at least one passive repeater member having at least one substantially continuous passive loop, the passive repeater member being adapted and positionable with respect to the RFID reader and the RFID tag to extend the redirect and/or extend the range of the magnetic flux field.

37 Claims, 8 Drawing Sheets

RFID PASSIVE REPEATER SYSTEM AND APPARATUS

CROSS REFERENCE TO RELATED APPLICATIONS

This application claims the benefit of U.S. Provisional Application No. 60/224,855, filed Aug. 11, 2000.

FIELD OF THE INVENTION

The present invention relates in general to radio frequency identification (RFID) devices, and more particularly to an RFID passive repeater system and apparatus.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transceiver receives its power from the base station or interrogator, such as the identification system disclosed in U.S. Pat. No. 4,654,658.

A typical RFID system is made up of reusable tags fixed to or embedded in product carriers, antennas that interrogate the tags via a RF link and a controller. The host (or computer) system interfaces with the controller and directs the interrogation of the tags.

RFID tags provide effective means of identifying, monitoring and controlling materials in a closed loop process. In the factory, tags are employed as the transport mechanism between "islands of automation," providing a record of each process which can be acted upon immediately or downloaded later for analysis.

The tags can be powered by an internal battery (i.e., an "active" tag) or by inductive coupling (i.e., a "passive" tag). Passive tags have zero maintenance and virtually unlimited life. The life span of an active tag is, however, limited by the lifetime of the battery, although some tags offer replaceable batteries. RFID tags also have limited applicability due to limitations on the operating range.

It is therefore an object of the present invention to provide a passive repeater system and apparatus having a least one passive loop (i.e., antenna) that effectively and efficiently extends the operating range of a conventional RFID tag.

It is another object of the invention to provide passive repeater system and apparatus that reduces orientation sensitivity of a conventional RFID tag.

SUMMARY OF THE INVENTION

In accordance with the above objects and those that will be mentioned and will become apparent below, the RFID passive repeater system in accordance with one embodiment of the invention preferably comprises a RFID reader having a magnetic flux field, at least one RFID tag and at least one passive repeater member having at least one substantially continuous passive loop, the passive loop being adapted and positionable with respect to the RFID reader and, tag to couple the reader and tag, the passive repeater member being further adapted and positionable with respect to the RFID reader and tag to redirect the magnetic flux field. In an alternative embodiment, the passive repeater member also extends the range of the magnetic flux field.

In a further embodiment of the invention, the RFID passive repeater system comprises a RFID reader having a magnetic flux field, at least one RFID tag and at least one passive repeater member having at least one substantially continuous passive loop, the passive loop being adapted and positionable with respect to the RFID reader and tag to couple the reader and tag, the passive repeater member being further adapted and positionable wit respect to the RFID reader and tag to extend the range of the magnetic flux field.

The passive repeater "product container" system in accordance with one embodiment of the invention comprises a RFID reader having a magnetic flux field, at least one RFID tag disposed on at least one item contained in a product container, and at least one passive repeater member disposed on one of the product container panels having at least one substantially continuous passive loop, the passive loop being adapted and positionable with respect to the RFID reader and tag to couple the reader and tag, the passive repeater member being further adapted and positionable with respect to the RFID reader and tag redirect the magnetic flux field. In an alternative embodiment the passive repeater member also extends the range of the magnetic flux field.

In additional embodiments of the passive repeater "product container" system, a passive loop is disposed directly on or embedded in at least one of the product container panels.

The passive repeater "product carrier" system in accordance with one embodiment of the invention comprises a RFID reader having a magnetic flux field, at least one RFID tag disposed on at least one product container or product contained in or disposed on a product carrier, and at least one passive repeater member, the passive repeater member having at least one substantially continuous passive loop, the passive loop being adapted and positionable with respect to the RFID reader and tag to couple the reader and tag, the passive repeater member being further adapted and positionable with respect to the RFID reader and tag redirect the magnetic flux field. In an alternative embodiment, the passive repeater member also extends the range of the magnetic flux field.

In additional embodiments of the passive repeater "product carrier" system a plurality of passive repeater members are disposed in the product carrier. In yet another embodiment of the passive repeater "product carrier" system a second passive loop is disposed on a wall of the product carrier.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

The present invention substantially reduces or eliminates the drawbacks and shortcomings associated with prior art RFID tags and related systems. As discussed in detail herein, the RFID passive repeater system and apparatus comprises one or more passive loops (i.e., antenna means) preferably disposed on a larger member that significantly enhances the operating range of individual tags positioned proximate a respective passive loop.

As will be appreciated by one having ordinary skill in the art, the invention is particularly useful in applications where multiple items are grouped together into a larger package, shipping unit, load, or other grouping of tagged items and need to be read at a distance greater than that which would be allowed by the relatively smaller size of the individually tagged items. Examples would be a pallet of boxes or items (see, e.g., FIGS. 6 and 7), a cart or bin or tote used to contain multiple items, a large box or packaging containing multiple small items (see, e.g., FIG. 8A), a shipping container with multiple Lagged items (see, e.g., FIG. 9A), or, as illustrated in FIG. 9A as a method of extending the read/write range between an RFID reader/writer 2 and a designated tag 14.

Figure 1:
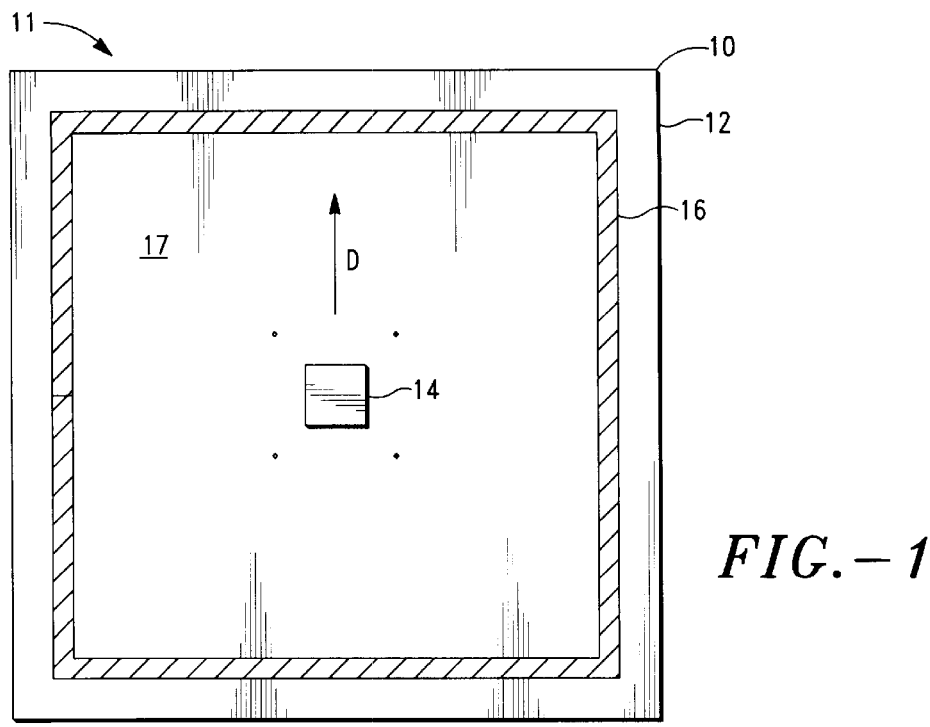
FIG. 1 is a plan view of one embodiment of the passive repeater apparatus accordingly to the invention.

Referring now to FIG. 1, there is shown one embodiment of the passive repeater apparatus 10. As illustrated in FIG. 1, the apparatus 10 includes a substrate 12 having first and second surfaces, a conventional RFID tag 14 and at least one passive conductive member or loop 16 adapted to transmit and receive RFID signals. According to the invention, the loop 16 is adapted and positionable with respect to the reader 5 and the tag 14 to couple the reader 2 and tag 14. According to the invention, the passive repeater apparatus 10 is further adapted and positionable with respect to the reader 2 and tag 14 to redirect the magnetic flux field (indicated generally "6") of the reader 2.

According to the invention, the substrate can comprise various non-conductive materials, such as paper, synthetic paper, cardboard, polyamide, polyester, Teflon™, ABS™, and like materials, or a material having a non-conductive area comprising the noted materials. In a preferred embodiment of the invention, the substrate comprises paper.

As will be appreciated by one having skill in the art, a number of conventional RFID tags can be employed within the scope of the present invention. Such tags are described in detail in numerous prior art references, including U.S. Pat. Nos. 6,121,878, 6,118,379 and 6,100,804, which are incorporated by reference herein.

As illustrated in FIG. 1, the tag 14 is preferably disposed on a surface of the substrate 12 proximate the loop 16 and is in communication therewith. More preferably, the tag 14 is disposed in the interior region 17 defined by the loop 12 (hereinafter referred to as the "loop region"). In a preferred embodiment of the invention, the tag 14 is disposed proximate the center of the loop region 17.

According to the invention, the maximum distance from the tag 14 to a point on the loop 16 (designated by Arrow D) is approximately 20 ft, more preferably, the maximum distance is approximately 15 ft. In a preferred embodiment of the invention, the maximum distance (D) from the tag 14 to the loop 16 is in the range of approximately 8 –12 ft.

According to the invention, the passive loop 16 can comprise various configurations and conductive materials that can be produced, applied to or embedded in the substrate 12 in various manners. For example, the loop 16 can be silk-screened on the substrate 12, comprise a metalized paint directly applied to the substrate 12, a substantially metalized or metallic foil bonded to the substrate 12 or a foil embedded in the substrate 12. In a preferred embodiment of the invention, the loop 16 comprises a copper foil that is bonded to a surface of the substrate 12 by conventional means (see FIG. 2C).

Figure 2A:
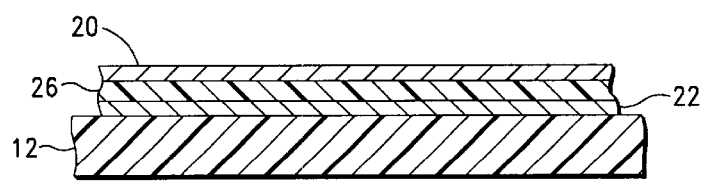
FIGS. 2A and 2B are partial sectional views of additional embodiments of the invention, illustrating the placement of dual passive loops according to the invention.
Figure 2B:
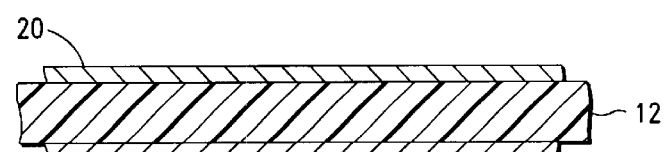
Figure 2C:
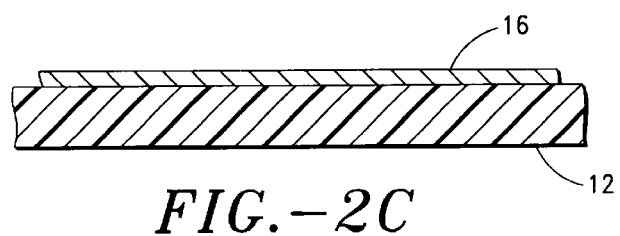
FIG. 2C is a partial sectional view of the embodiment of the invention shown in FIG. 1.

In additional envisioned embodiments of the invention, two passive loops 20, 22 are employed. As illustrated in FIGS. 2A and 2B, the loops 20, 22 can either be bonded to one surface or side of the substrate 12 with an insulating layer 26, such as polyester, disposed therebetween (FIG. 2A) or disposed on opposing sides of the substrate 12 (FIG. 2B).

According to the invention, the passive loop 16 (or loops 20, 22) preferably has an inductance and a capacitance that is tuned to or close to the operating frequency of the respective tag (s) 14 (e.g., common ISM bands). In additional envisioned embodiments of the invention, the loop 16 has distributed capacitance, or a combination of fixed and distributed capacitance that is tuned to or close to the operating frequency of the respective tag(s) 14.

Figure 3:
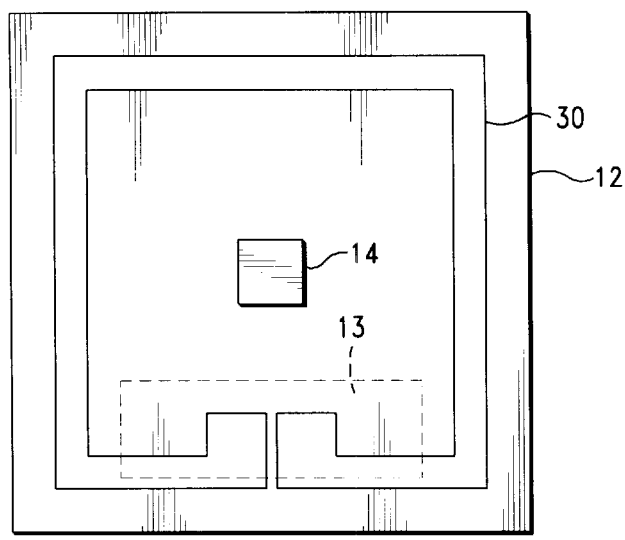
FIG. 3 is a plan view of an additional embodiment of the passive repeater apparatus according to the invention.
Figure 4:
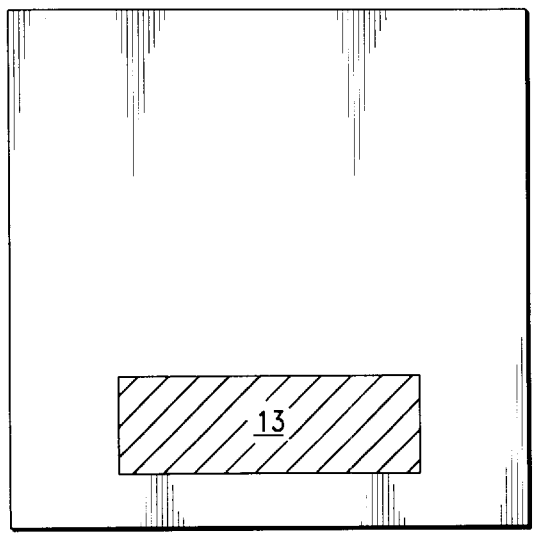
FIG. 4 is a plan view of the bottom surface of the embodiment of the invention shown in FIG. 3.
Figure 5:
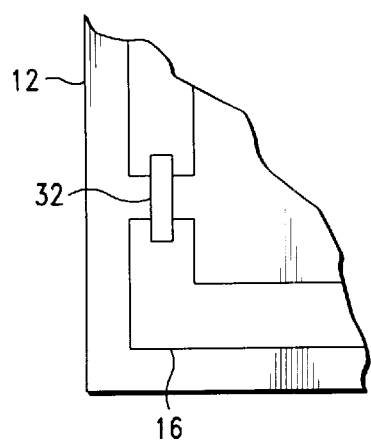
FIG. 5 is a partial plan view of an additional embodiment of the passive loop according to the invention.

Referring now to FIGS. 3 and 4, communication by and between a "discontinuous" passive loop 30 and a respective tag 14 can further be achieved by virtue of a metalicized substrate segment 13 disposed on the opposing surface of the substrate 12. As illustrated in FIG. 5, a conventional capacitor 32 can also be employed.

Figure 6:
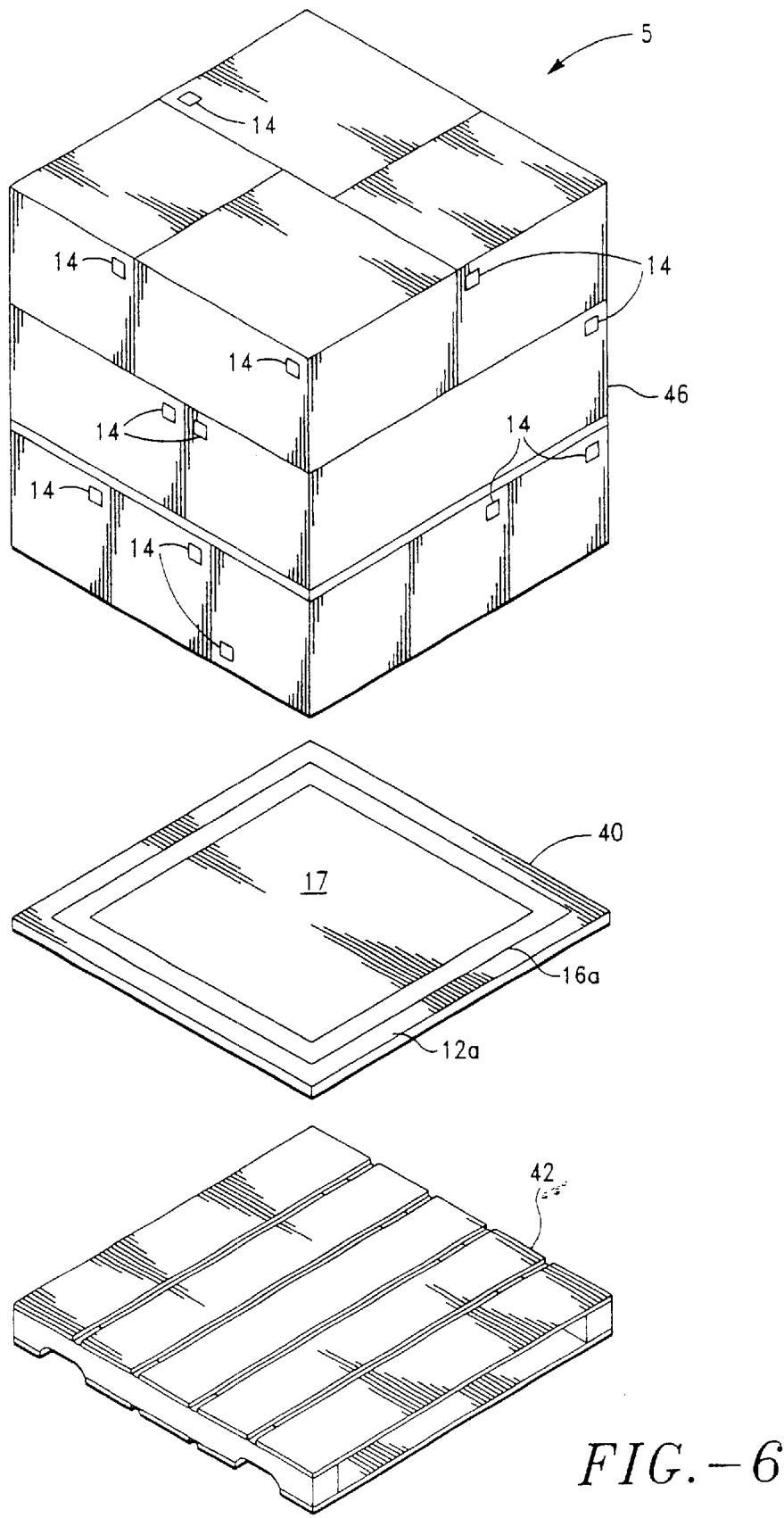
FIG. 6 is an exploded, perspective view of one embodiment of the passive repeater system according to the invention.

Referring now to FIG. 6, there is shown an additional embodiment of the invention. In the noted embodiment, the passive repeater apparatus, designated generally 40, comprises a substrate 12a having a passive loop 16a thereon.

According to the invention, the substrate 12a and loop 16a can comprise various configurations, such as the substantially square shaped loop 16a shown in FIG. 6. In additional envisioned embodiments, a plurality of loops or a single, multi-wound loop can be employed.

In additional envisioned embodiments of the invention, not shown, the substrate and passive loop comprise an integral unit, such as an injection molded loop with impregnated ink. In yet further invisioned embodiments, a substantially rigid loop (e.g., wire) is employed without a supporting substrate.

Referring back to FIG. 6, in a single loop 16a system Applicant has found that effective enhancement of RFID signals can be achieved with a passive repeater apparatus 40 having a loop region area in the range of approximately 1.0 sq. in. to 400 sq. ft. Thus, as discussed below, the passive repeater apparatus 40 is readily adaptable to multiple applications.

Figure 7:
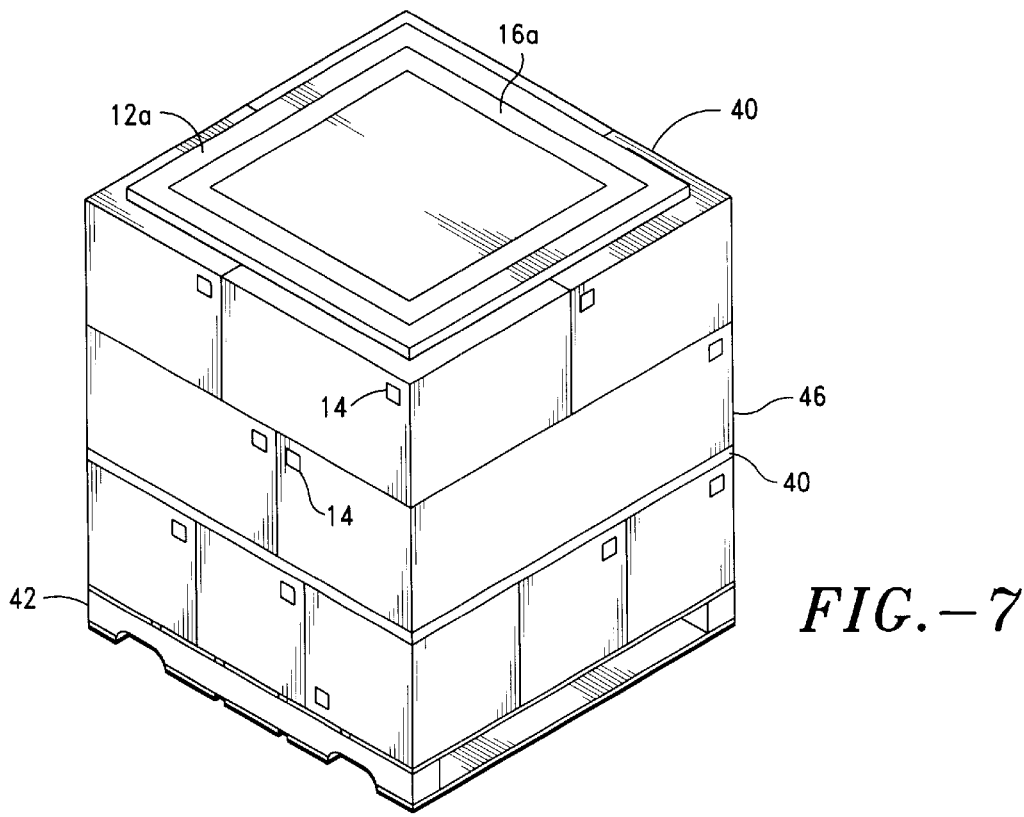
FIG. 7 is a perspective view of an additional embodiment of the passive repeater system according to the invention.

As illustrated in FIGS. 6 and 7, to passive repeater apparatus 40 is preferably disposed proximate a single tag 14, a group of tags, or placed within an aggregate grouping of items containing tags 14 or placed on or built into a device used to group, contain, hold, transport, or otherwise group for storage, transport, or delivery a group of items tat are tagged (e.g., container 48b, shipping pallet 42). According to the invention, the passive repeater apparatus 40 preferably magnetically coupled the RFID reader and the tag(s) 14.

FIGS. 6 and 7 further illustrate several embodiments of passive repeater systems according to the invention. Referring first to FIG. 6, there is shown a passive repeater system, designated generally 5, comprising the passive repeater apparatus 40 and a palletized group of boxes 46 (at least one of the boxes 46 having a tag thereon) where the apparatus 40 is disposed between the pallet 42 and the boxes 46.

Referring now to FIG. 7, there are shown additional embodiments of the passive repeater system comprising the passive repeater apparatus 40 and the same palletized group of boxes 46. In the noted embodiments, the passive repeater apparatus 40 is disposed on top of the boxes and/or within the group of boxes 46. In an additional envisioned embodiment of the invention, not shown, the passive repeater apparatus 40 or a separate passive loop 16 is embedded in the pallet 42.

Figure 8A:
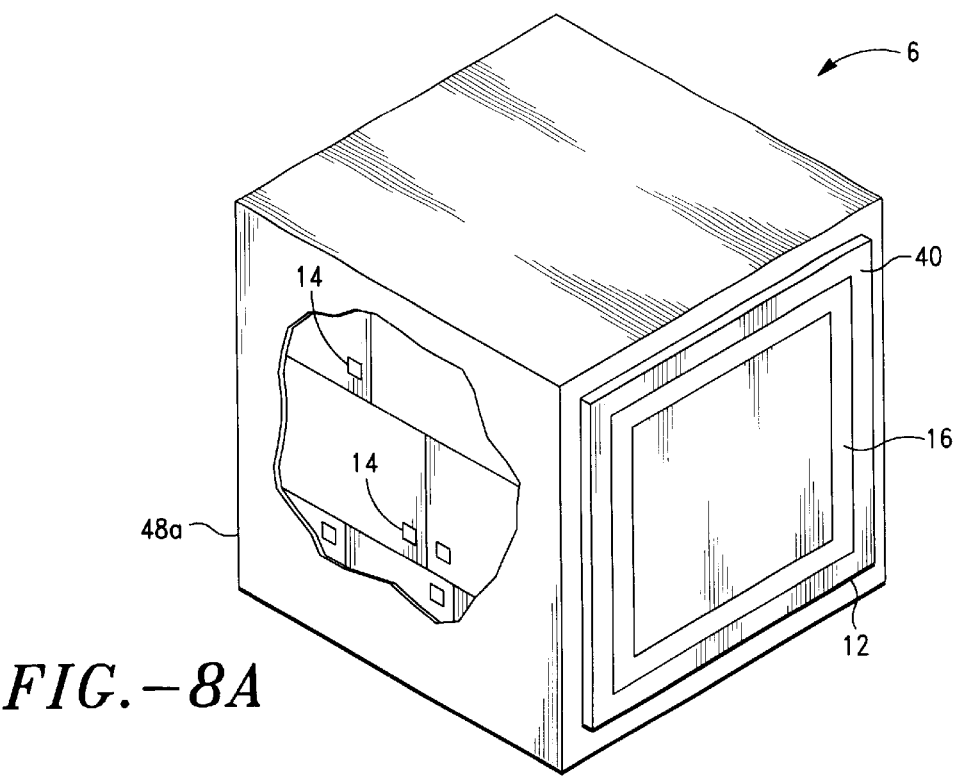
FIGS. 8A–8C are perspective views of further embodiments of the passive repeater system, illustrating a passive repeater "container" system according to the invention.
Figure 8B:
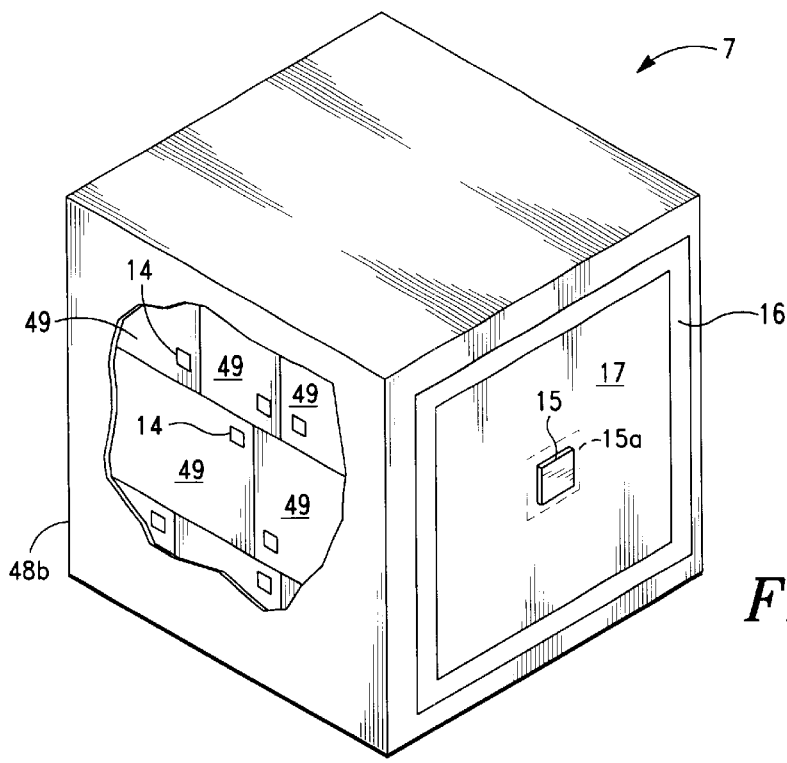
Figure 9A:
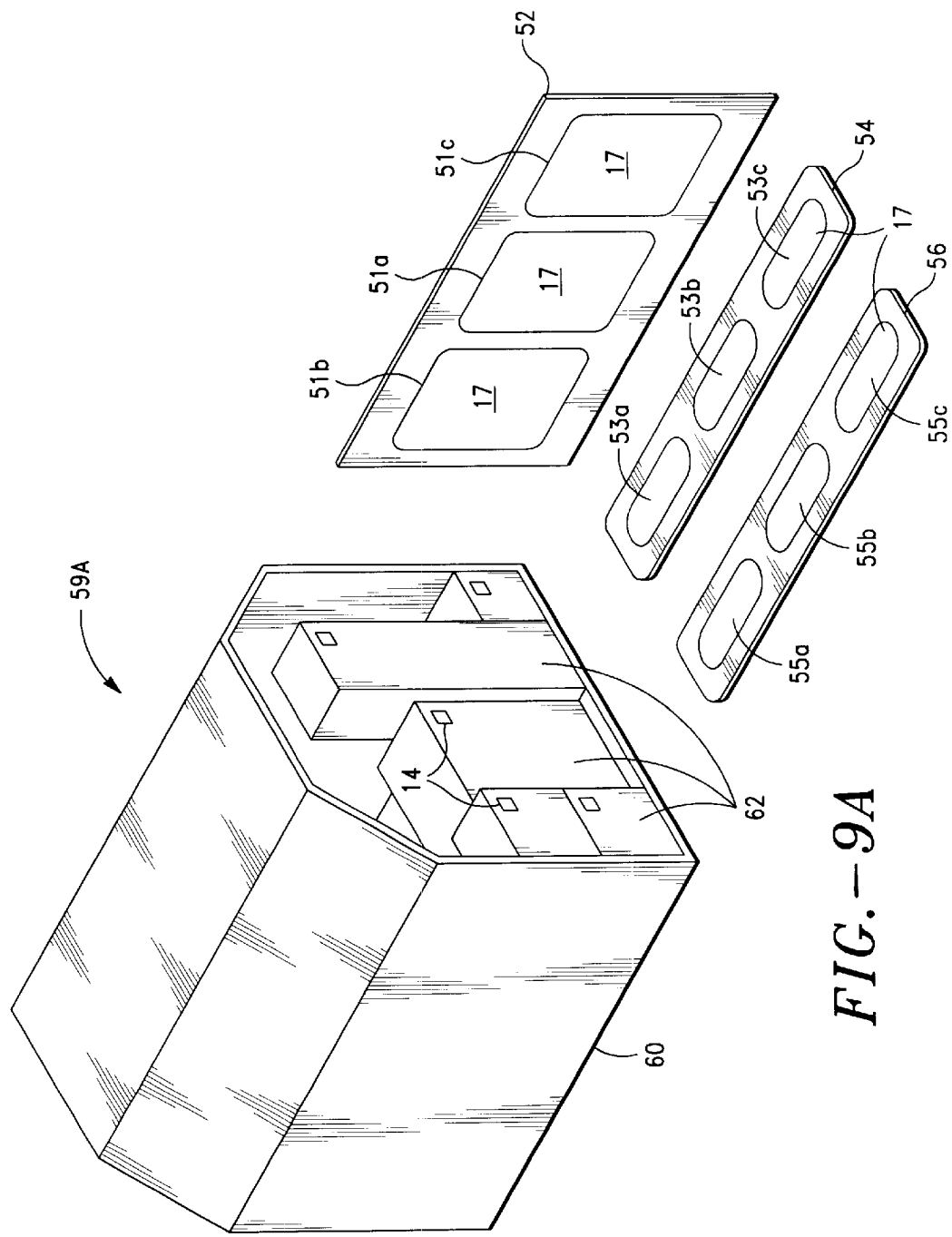
FIGS. 9A and 9B are perspective views of yet further embodiments of the passive repeater system, illustrating a passive repeater "shipping container" system according to the invention.

Referring now to FIGS. 8A and 8B there are shown further embodiments of passive repeater systems 6, 7. Referring first to FIG. 8A, the passive repeater system 6 comprises a container 48a having at least one product container 49 disposed therein and at least one passive repeater apparatus 40 disposed on at least one outer surface of the container 48a.

Referring now to FIG. 8B, the passive repeater system 7 comprises a container 48b having at least one product container 49 disposed therein and at least one passive loop 16 disposed on or embedded in (not shown) at least one surface of the container 48b. In an additional embodiment of the invention, discussed below, the passive repeater system 7 includes a further tag 15 preferably disposed on an outer surface of the container 48b proximate the passive loop 16.

Referring now to FIG. 9A, there is shown a further passive repeater system 59a. In this embodiment, the passive repeater system 59a includes at least one substantially elongated panel 52 having at least one passive loop (e.g., 51a) thereon that is positioned in a shipping container 60 with packages 62. According to the invention, the panel 52 is preferably constructed of plastic, cardboard, wood and other like materials, and can comprise various shapes and sizes.

As stated, according to the invention, the panel 52 includes at least one passive loop (e.g., 51a) disposed on one surface of the panel 52. In a preferred embodiment of the invention, the panel 52 includes a plurality of passive loops 51a, 51b, 51c preferably disposed on one side of the panel 52. In additional envisioned embodiments of the invention, not shown, the loops 51a, 51b, 51c are disposed on both sides of the panel—e.g., loops 51b and 51c on one side and loop 51a on the opposing side—or additional loops are employed and disposed on the opposite side.

According to the invention, the passive loops 51a, 51b, 51c would similarly have a loop region area in the range of approximately 1.0 sq. in. to 400 sq. ft. In a preferred embodiment of the invention, the loop region area is in the range of approximately 0.25 sq. ft to 100 sq. ft.

As illustrated in FIG. 9A, the passive repeater system 59a preferably includes a plurality of panels 52, 54, 36. According to the invention, the panels 52, 54, 56 are preferably magnetically coupled to the tag(s) 14 which allows the individual tags 14 on the packages 62 to be read by a RFID reader 2 from a greater distance, preferably outside of the shipping container 60.

Figure 8C:
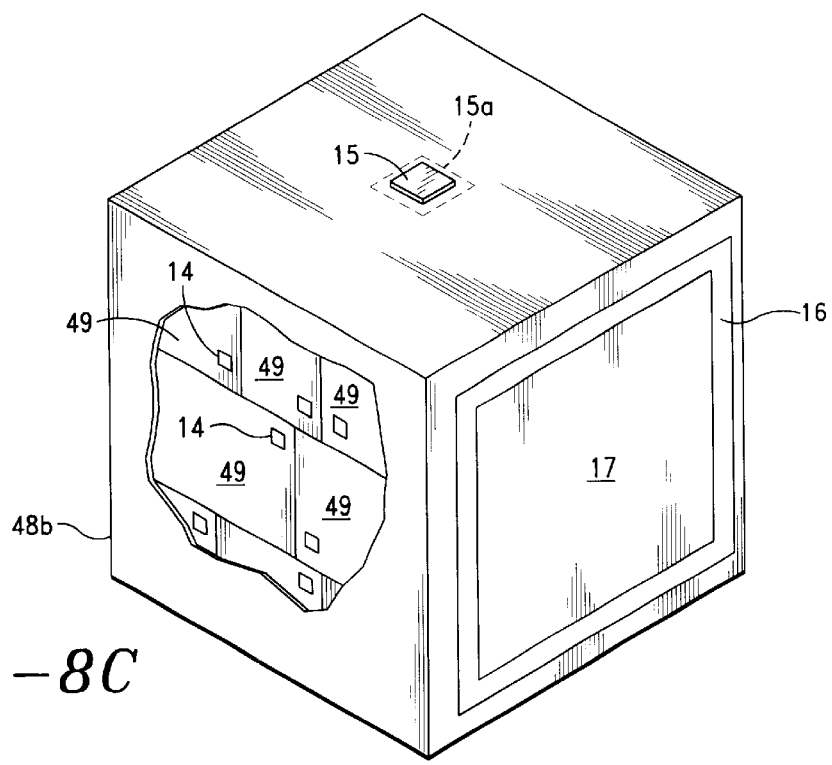
Figure 8D:
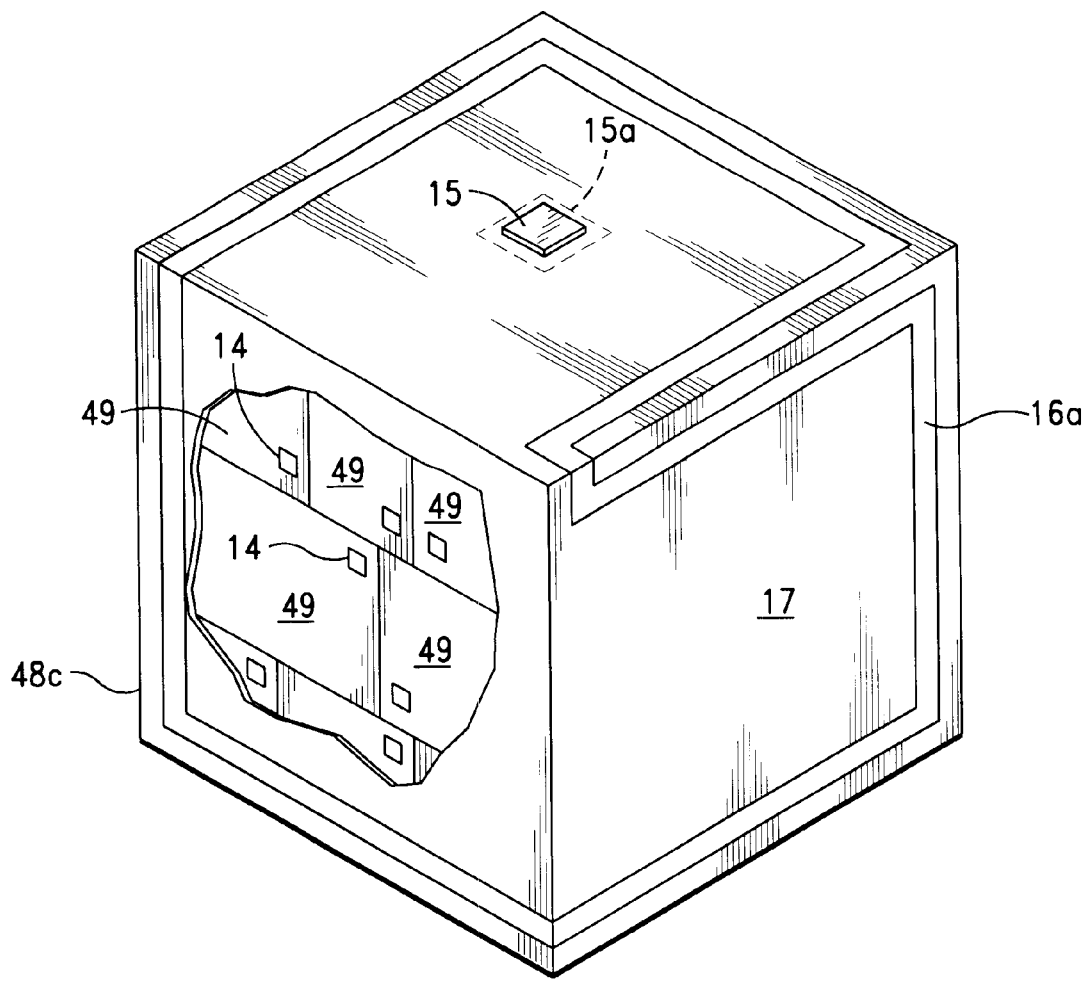

Referring now to FIGS. 8B–8D, to further enhance the receipt and transmission of RF signals to a respective one (or more) of the packages 62 in the shipping container 60, the package 62 can comprise a container 48b having at least one further loop 16 disposed on at least one surface the container 48b (see FIGS. 8B and 8C) or a container 48c having a larger substantially continuous loop 16a disposed on at least two surfaces of the container 48c (see FIG. 8D). The package 62 can further comprise the container 48a (i.e., passive repeater system 6) shown in FIG. 8A.

According to the invention, the containers 48a, 48b, 48c can further include an additional tag 15 disposed on or embedded in the exterior of the container 48a, 48b, 48c proximate a respective loop 16, 16a (see FIGS. 8B–8D) or a passive repeater apparatus. In a preferred embodiment of the invention, the tag 15 is disposed within the loop region area 17 (see FIG. 8B).

As illustrated in FIGS. 8B–8D, the tag 15 further includes means for detaching the tag 15 from the container 48b, 48c (denoted generally 15a) and, in a preferred embodiment, means for reattaching the tag 15 to a respective one of the product containers 49 or the product contained therein. Thus, any data or information acquired while the product (or product container 49) is in the container 48b, 48c remains with the product throughout its lifetime.

Further details regarding the noted "Tag-in-Tag" (or removable tag) concept is set forth in Co-pending Application Ser. No. 09/925,225, which is incorporated by reference herein.

Figure 9B:
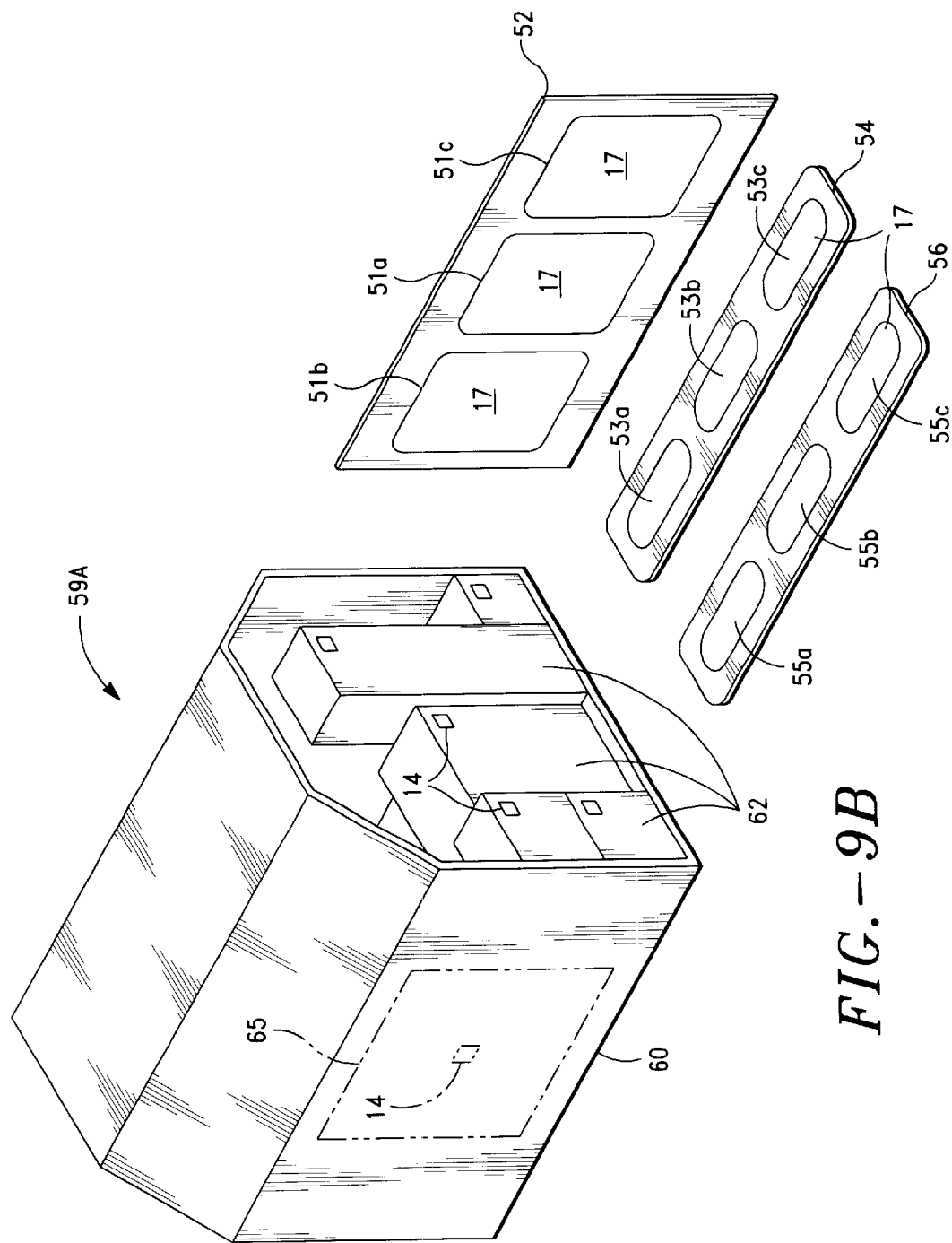

In further envisioned embodiments of the invention, an additional passive loop, such as passive loop 65 shown in phantom in FIG. 9B, is employed with coils magnetically or electrically coupled to at least one internally disposed panel (e.g., 52). According to the invention, the RF field at or around the frequency of operation of the RFID system is translated from the area outside of the shipping container 60 where the RFID equipment is located to the inside of the container 60 where the panel 52 or panels 52, 54, 56 are positioned to further enhance communication with the tags 14 on packages 62 (or product containers 49) inside the shipping container 60.

Referring now to FIG. 9B, in yet another envisioned embodiment of the invention, a separate tag 14 is similarly disposed within (or proximate) a container loop 65 in order to acquire and store information about the container 60 and/or it's contents. Information such as the container contents, serial number, origin and destination points, transport identification (e.g., flight number), tracking number for the entire shipment and/or any data related to the container 60 can thus be readily accessed at one convenient point.

According to the invention, the tag 14 can also include detachment means similar to the detachment means 15a disclosed in App'l Ser. No. 09/925,225 and discussed above to facilitate subsequent placement of the tag 14 (with the noted information) on a respective one of the packages 62 or product containers 49 or products contained therein. The tag 14 can also be placed in a central location or depository.

As will be appreciated by one having skill in the art, the container loop 65 can be disposed on the interior portion of the shipping container 60 or embedded in a wall thereof. The noted container loop 65 can also be employed as a stand-alone system (i.e., without panels 52, 54, 56).

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A passive repeater system, comprising:
   a RFID reader having a magnetic flux field;
   at least one RFID tag, said RFID tag having a first operating frequency; and
   at least one passive repeater member having at least one substantially continuous passive loop, said passive loop being adapted and positionable with respect to said RFID reader and said RFID tag to couple said RFID reader and said RFID tag, said passive repeater member being adapted and positionable with respect to said RFID reader and said RFID tag to redirect said magnetic flux field.

2. The passive repeater system of claim 1, wherein said passive repeater member extends the range of said magnetic flux field.

3. The passive repeater system of claim 1, wherein said passive loop is adapted to magnetically couple said RFID reader and said RFID tag.

4. The passive repeater system of claim 1, wherein said passive loop has an inductance and a capacitance that is substantially equal to said first operating frequency.

5. A passive repeater system for a product container, said product container having at least one article disposed therein, comprising:

a RFID reader having a magnetic flux field;

at least one RFID tag, said RFID tag being attached to said article; and at least one passive repeater member, said passive repeater member being disposed on said product container, said passive repeater member including at least one substantially continuous passive loop, said passive loop being adapted and positionable with respect to said RFID reader and said RFID tag to couple said RFID reader and said RFID tag, said passive repeater member being adapted and positionable with respect to said RFID reader and said RFID tag to redirect said magnetic flux field.

6. The passive repeater system of claim 5, wherein said passive repeater member is substantially embedded in said product container.

7. The passive repeater system of claim 5, wherein said passive repeater member extends the range of said magnetic flux field.

8. The passive repeater system of claim 5, wherein said passive loop defines a loop region area.

9. The passive repeater system of claim 8, wherein said loop region area is in the range of 1.0 sq. in. to 400 sq. ft.

10. A passive repeater system for a plurality of product containers, said product containers being disposed on transport means, comprising:

a RFID reader having a magnetic flux field;

at least one RFID tag, said RFID tag being disposed on at least a respective one of said product containers; and at least one passive repeater member, said passive repeater member being disposed proximate said plurality of product containers, said passive repeater member including at least one substantially continuous passive loop, said passive loop being adapted and, positionable with respect to said RFID reader and said RFID tag to couple said RFID reader and said RFID tag, said passive repeater member being adapted and positionable with respect to said RFID reader and said RFID tag to redirect said magnetic flux field.

11. The passive repeater system of claim 10, wherein said passive repeater member is disposed within said plurality of product containers.

12. The passive repeater system of claim 10, wherein said passive repeater member is disposed between said plurality of product containers and said transport means.

13. The passive repeater system of claim 10, wherein said passive repeater member is embedded in said transport means.

14. The passive repeater system of claim 10, wherein said passive repeater member extends the range of said magnetic flux field.

15. The passive repeater system of claim 10, wherein said passive repeater member is disposed immediately adjacent to said plurality of product containers.

16. The passive repeater system of claim 10, wherein said passive loop defines a loop region area.

17. The passive repeater system of claim 16, wherein said loop region area is in the range of 1.0 sq. in. to 400 sq ft.

18. A passive repeater system for a product carrier having a floor portion and at least two side walls, said product carrier having an interior section, said product carrier including at least one item disposed in said product carrier interior section, comprising:

a RFID reader having a magnetic flux field;

at least one RFID tag, said RFID tag being disposed on said item; and at least a first passive repeater member, said first passive repeater member being disposed in said product carrier interior section, said first passive repeater member including at least a first substantially continuous passive loop, said first passive loop being adapted and positionable with respect to said RFID reader and said RFID tag to couple said RFID reader and said RFID tag, said first, passive repeater member being adapted and positionable with respect to said RFID reader and said RFID tag to redirect said magnetic flux field.

19. The passive repeater system of claim 18, wherein said passive repeater system includes second and third passive repeater members, said second passive repeater member including a second passive loop, said third passive repeater member including a third passive loop, said second and third passive loops being adapted and positionable with respect to said first passive loop, said RFID reader and said RFID tag to couple said RFID reader and said a RFID tag.

20. The passive repeater system of claim 19, wherein said second passive repeater member is disposed in said product carrier interior section proximate one of said product carrier walls and said third passive repeater member is disposed in said product carrier interior section proximate a different one of said product carrier walls.

21. The passive repeater system of claim 19, wherein said second passive repeater member is disposed in said product carrier interior section proximate one of said product carrier walls and said third passive repeater member is disposed in said product carrier interior section proximate said floor portion.

22. The passive repeater system of claim 19, wherein said passive repeater system includes a fourth passive loop being adapted and positioned with respect to said first, second and third passive loops and said RFID reader and RFID tag to couple said RFID reader and said RFID tag.

23. The passive repeater system of claim 22, wherein said fourth passive loop is disposed on a selected one of said product carrier walls.

24. The passive repeater system of claim 22, wherein said fourth passive loop is substantially embedded in a selected one of said product cater walls.

25. The passive repeater system of claim 19, wherein said second and third passive repeater members redirect said magnetic flux field.

26. The passive repeater system of claim 19, wherein said second and third passive repeater members extend the range of said magnetic flux field.

27. The passive repeater system of claim 18, wherein said first passive repeater member extends the range of said magnetic flux field.

28. The passive repeater system of claim 18, wherein said item comprises a product container.

29. The passive repeater system of claim 18, wherein said item comprises a product.

30. The passive repeater system of claim 18, wherein each of said first, second, third and fourth passive loops define a loop region area.

31. The passive repeater system of claim 30, wherein said loop region area is in the range of 1.0 sq. in. to 400 sq ft.

32. A passive repeater system, comprising:
- a RFID reader having a magnetic flux field;
- at least one RFID tag; and
- at least one passive repeater member having at least one substantially continuous passive loop, said passive loop being adapted and positionable with respect to said RFID reader and said RFID tag to couple said RFID reader and said RFID tag,
- said passive repeater member being adapted and positionable with respect to said RFID reader and said RFID tag to extend the range of said magnetic flux field.

33. A passive repeater system, comprising:
- at least one product container, said product container having at least a first article disposed therein;
- a RFID reader having a magnetic flux field;
- at least one RFID tag, said RFID tag being removably attached to said first article, said RFID tag being adapted to be removed from said first article and re-attached to at least a second article; and
- at least one passive repeater member, said passive repeater member being attached to said product container, said passive repeater member including a substantially continuous passive loop adapted and positionable with respect to said RFID reader and said RFID tag to couple said RFID reader and said RFID tag, said passive repeater member being adapted and positionable with respect to said RFID reader and said RFID tag to redirect said magnetic flux field.

34. The passive repeater system of claim 33, wherein said passive repeater member extends the range of said magnetic flux field.

35. The passive repeater system of claim 33, wherein said RFID tag is removably attached to said product container.

36. The passive repeater system of claim 33, wherein said passive repeater member is embedded in said product container.

37. The passive repeater system of claim 33, wherein said passive repeater member is disposed proximate said product container.

* * * * *